(12) United States Patent
Ono et al.

(10) Patent No.: US 8,831,768 B2
(45) Date of Patent: Sep. 9, 2014

(54) NUMERICAL CONTROL DEVICE, METHOD OF CONTROLLING THE SAME, AND SYSTEM PROGRAM THEREFOR

(75) Inventors: Shunro Ono, Chiyoda-ku (JP); Kotaro Nagaoka, Chiyoda-ku (JP); Tomonori Sato, Chiyoda-ku (JP); Daisuke Fujino, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 395 days.

(21) Appl. No.: 13/133,443

(22) PCT Filed: Feb. 17, 2009

(86) PCT No.: PCT/JP2009/000628
§ 371 (c)(1),
(2), (4) Date: Jun. 8, 2011

(87) PCT Pub. No.: WO2010/095164
PCT Pub. Date: Aug. 26, 2010

(65) Prior Publication Data
US 2011/0238204 A1 Sep. 29, 2011

(51) Int. Cl.
*G06F 19/00* (2011.01)
*G05B 19/04* (2006.01)
*G05B 19/18* (2006.01)
*G05B 19/41* (2006.01)
*G05B 19/25* (2006.01)
*G05B 19/4093* (2006.01)
*G05B 19/4103* (2006.01)

(52) U.S. Cl.
CPC .. *G05B 19/4093* (2013.01); *G05B 2219/33269* (2013.01); *G05B 19/4103* (2013.01)
USPC ........... 700/194; 700/187; 700/189; 700/252; 318/568.15; 318/573

(58) Field of Classification Search
USPC ......... 700/159, 173, 186, 187, 189, 192, 194, 700/252; 318/560, 567, 568.1, 568.11, 318/568.15, 569, 570, 573
See application file for complete search history.

(56) References Cited

U.S. PATENT DOCUMENTS 4,150,328 A * 4/1979 Cannon ......................... 318/573
4,493,032 A * 1/1985 Johnson ........................ 700/189
(Continued)

FOREIGN PATENT DOCUMENTS

| CN | 1746799 A | 3/2006 |
|---|---|---|
| JP | 5-241646 A | 9/1993 |
| JP | 9-311708 A | 12/1997 |
| JP | 2003-195917 A | 7/2003 |
| JP | 2006-72909 A | 3/2006 |

OTHER PUBLICATIONS

Chinese Office Action dated Mar. 5, 2013 in corresponding Chinese Application No. 200980155821.

*Primary Examiner* — Crystal J. Barnes-Bullock
(74) *Attorney, Agent, or Firm* — Sughrue Mion, PLLC; Richard C. Turner (57) ABSTRACT

A CPU 41 reads a next block (S1), and then determines whether the read block is a TCP (tool center point) control finish command "G49" or not (S2). If it is determined to be the TCP control finish command "G49", the TCP control is finished. If it is determined not to be the TCP control finish command "G49", whether the read block is a coordinate-system transformation command "P1" or not is determined (S3). Next, if it is determined not to be the coordinate-system transformation command "P1", the TCP control is performed, without transforming the coordinate system, in accordance with a command of the block (S11). Next, the process returns to S1, and then the process after S1 is executed. If it is determined to be the coordinate-system transformation command "P1", a start point (xs, ys, zs, bs, cs) and an end point (xe, ye, ze, be, ce) in a non-machine coordinate system, of the block are transformed into a start point (Xs, Ys, Zs, Bs, Cs) and an end point (Xe, Ye, Ze, Be, Ce) in a machine coordinate system, respectively (S4).

3 Claims, 4 Drawing Sheets

(56) References Cited

U.S. PATENT DOCUMENTS

| | | | |
|---|---|---|---|
| 5,194,793 A * | 3/1993 | Niimi | 318/568.15 |
| 5,602,453 A | 2/1997 | Sekikawa | |
| 7,136,718 B2 | 11/2006 | Kozai et al. | |
| 7,155,303 B2 * | 12/2006 | Sagasaki et al. | 700/173 |
| 8,131,396 B2 * | 3/2012 | Yamada | 700/189 |
| 2003/0120376 A1 | 6/2003 | Shibata et al. | |
| 2006/0052900 A1 | 3/2006 | Kozai et al. | |
| 2011/0166693 A1 * | 7/2011 | Nishibashi | 700/187 |

* cited by examiner

NUMERICAL CONTROL DEVICE, METHOD OF CONTROLLING THE SAME, AND SYSTEM PROGRAM THEREFOR

CROSS REFERENCE TO RELATED APPLICATIONS

This application is a National Stage of International Application No. PCT/JP2009/000628 filed Feb. 17, 2009, the contents of all of which are incorporated herein by reference in their entirety.

TECHNICAL FIELD

The present invention relates to a numerical control device for controlling, based on a machining program, a machine tool having a plurality of linear movement axes and at least one rotational movement axis for turning a table, to machine using a tool a workpiece fixed to the table, and relates to a method of controlling the numerical control device, and a system program therefor executed by a central processing unit therein.

BACKGROUND ART

Figure 1:
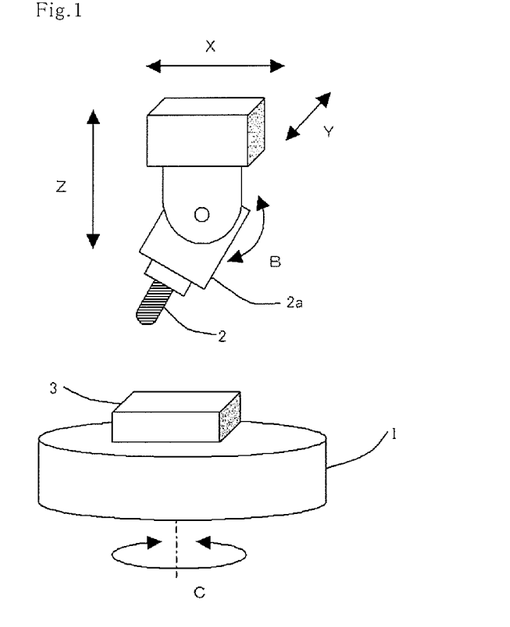
FIG. 1 is a view representing an example of a five-axis machining apparatus.

Previously, as a machine tool having at least one rotation axis for turning a table to which a workpiece is fixed, a numerical control device has been known which has a plurality of linear axes and a single table rotation axis, and further has at least one table rotation axis or at least one tool swinging axis. For example, as represented in FIG. 1, a five-axis machine tool has been known in which, in addition to a tool 2 being driven by three linear axes as the X, Y, and Z axes perpendicular to each other, the tool 2 is rotationally controlled by a rotation axis B around the Y axis, and a table 1 is controlled by a rotation axis C around the Z axis, whereby, a workpiece 3 fixedly mounted on the table 1 is machined.

In a machine tool having at least one table rotation axis, a case may occur in which, in order to ensure the tool moving relative to a workpiece rotated by turn of the table based on a path and speed commanded by a machining program, the tool is moved in a coordinate system different from a machine coordinate system previously set for the machine tool. For example, in a TCP (tool center point) control method where the path and speed commanded by the machining program and the path and speed of a TCP (edge position of the tool) with respect to the workpiece are controlled to be coincident with each other, the tool is moved in a table coordinate system that rotates with the turn of the table to which workpiece is fixed, or in a work coordinate system that does not rotate with the turn of the table, in addition to in the machine coordinate system.

For example, a TCP control method is disclosed in Patent Document 1 in which, by an interpolation in the table coordinate system, a workpiece is linearly machined.

Generally, in a numerical control device, in accordance with a machining program written using a command code called as G-code, a command is given to a servo amplifier for turning a servo motor that drives an X, Y, Z, B, and C axis, etc. An operation commanded by the machining program includes two kinds of operations: a machining operation and an operation other than the machining operation (hereinafter referred to as a non-machining operation). The machining operation includes an operation that the tool directly cut-machines a workpiece, while the non-machining operation includes, for example, operations of positioning the table turn axis for positioning the workpiece, moving the tool to a position at which a hole is drilled through the workpiece, and approaching the tool to the workpiece.

The following program is an example of a non-machining operation command for the TCP control, which represents a command, in order to determine the opposite-side face of the workpiece, for positioning the C-axis in the table coordinate system. Here, to simplify the explanation, machining commands, such as for a cutting operation, etc., are not represented. The position of the C-axis as the table rotation axis is assumed to be previously set at 0 degree.

Conventional Machining-Program Example 1

Figure 2:
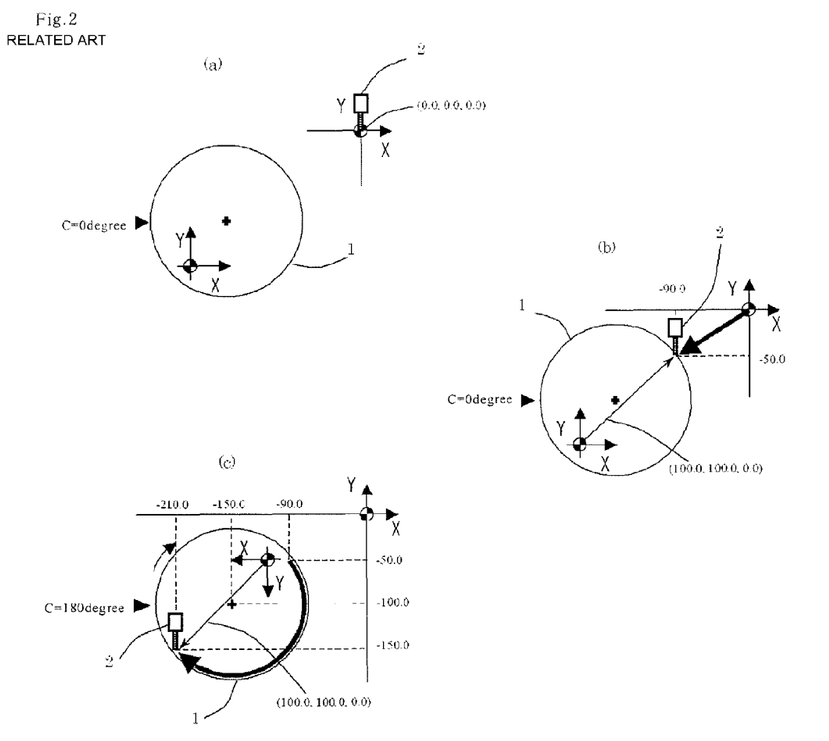
FIG. 2 is an operation explanatory view of a machine tool operating with a conventional machining-program example 1.

N100 G28 XYZ: Reset to machine origin point
N200 G54 G00 X100.Y100.: Select work coordinate system, Position to start point
N300 G43.4: Start TCP control
N400 G00 C180.: Position (in table coordinate system)
N500 G49: Finish TCP control According to the above "conventional machining-program example 1", the machine tool operates as in FIG. 2. Here, FIG. 2 is views viewed from the Z-axis(+) direction, where the workpiece 3, not illustrated, is mounted to be fixed to the table 1. In the N100 block, "G28" is a command code for resetting to the mechanical origin point, and, as represented in FIG. 2(a), the tool 2 moves to the origin point (0.0, 0.0, 0.0) in the mechanical coordinate system. While, in the N200 block, "G54" is a command code for selecting the work coordinate system. In the N200 block, "G00" is a command code for positioning, which is used in a case when the tool or the table is intended to be rapidly moved to an end point commanded during the non-machining operation. Therefore, as represented in FIG. 2(b), the N200 block is a command for moving the tool 2 to the end point (100.0, 100.0, 0.0) in the work coordinate system. Here, heavy line arrows in FIG. 2 indicate loci of the tool 2, while the position (100.0, 100.0, 0.0) in the work coordinate system is conveniently indicated by vectors. Thus, the end point of the N200 block is to be a start point for the TCP control starting in the next N300 block. In the N300 block, "G43.4" is a command code for starting of the TCP control; afterward, the TCP control is executed until the block including "G49" which is a command code for finishing of the TCP control is read in.

The N400 block, as represented in FIG. 2(c), is a positioning command in the table coordinate system, for turning the C-axis to an end point, where the end point of the C-axis is set to 180 degrees by the positioning command code "G00". Therefore, the C-axis rotates for 180 degrees from the start point of 0 degree to the end point of 180 degrees. At this time, because the tool 2 follows the rotation around the C-axis of the table 1 while keeping a relative position against the table 1, the tool 2 moves along a circular path represented by the heavy line arrow. In the N500 block, "G49" is a command code for finishing of the TCP control, by which the TCP control is finished.

As the N400 block of the above "conventional machining-program example 1", regarding the command in the table coordinate system, in order to move the table rotation axis and the tool tip to the end points, only the end point of the table rotation axis may be commanded. Therefore, the machining program is easy to create. As described above, in the TCP control, regarding not only the machining operation but also non-machining operation, a command in a coordinate system different from the machine coordinate system (hereinafter refer to as a non-machine coordinate system) is executed in many cases.

However, because, when such above-described command in the non-machine coordinate system is executed, due to turning of the table, the TCP moves from the start point to the end point along the circular path, the TCP does not move along a linear path connecting from the start point to the end point. Therefore, because a creator who creates the machining program, and an operator who operates the machine tool cannot predict, especially when the non-machining operation is performed, how the tool moves with the table rotation, there is possibility of the tool departing from its stored stroke limit range to move, or interfering with a peripheral device and the like.

During a non-machining operation, on the other hand, relative positions between the table and the tool are unnecessary to hold. For that reason, in order to solve such above-described problem, the tool may moves along a linear path connecting from a start point to an endpoint. In order to move the tool as described above by a command in the non-machine coordinate system, a plurality of blocks may be exchanged for the N400 block of the above "conventional machining-program example 1", by which blocks commanded are a series of small line-segments along the linear path and the respective both ends of the line-segments are defined as a start and end points. However, this results in increase in the number of blocks in the machining program.

In order to move the tool along the linear path, another machining program can be created instead of the "conventional machining-program example 1". The following machining program is an example of the non-machining-operation command in the TCP control, in which commands for positioning the tool and the C-axis are represented for determining the opposite-side face of the workpiece in the machine coordinate system.

Conventional Machining-Program Example 2

Figure 3:
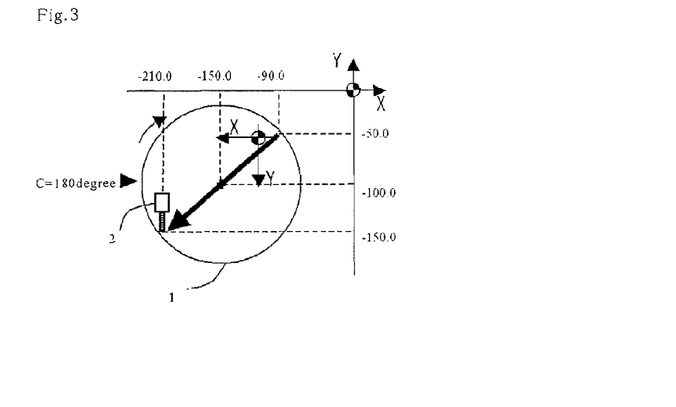
FIG. 3 is an operation explanatory view of a machine tool operating with a conventional machining-program example 2 or a machining-program example according to the present invention.

N100 G28 XYZ: Reset to mechanical origin point
N200 G54 G00 X100. Y100.: Select work coordinate system, Position to start point
N300 G43.4: Start TCP control
N400 G53 X-210. Y-150. C180.: Position in machine coordinate system
N500 G49: Finish TCP control A different point between the "conventional machining-program example 2" and the "conventional machining-program example 1" is that the command in the N400 block of the "conventional machining-program example 1" is "G00 C180.", but that of the "conventional machining-program example 2" is "G53 X-210. Y-150. C180.". According to the N400 block of the "conventional machining-program example 2", the machine tool operates as represented in FIG. 3. Here, FIG. 3 is a view viewed from the Z-axis(+) direction, where the workpiece 3, not illustrated, is mounted to be fixed to the table 1. The blocks except for this N400 block are the same as those of the "conventional machining-program example 1".

In the N400 block of the "conventional machining-program example 2", "G53" is a command code for selecting the machine coordinate system. Therefore, in the N400 block, as represented in FIG. 3, accompanying the end point of the C-axis being set at 180 degrees by the positioning command code "G00", a positioning command is executed to rotate the C-axis to the end point and to move the tool 2 to Point (−210.0, −150.0, 0.0) in the machine coordinate system. Point (−210.0, −150.0, 0.0) in the machine coordinate system is the end point of the tool 2 specified in the machine coordinate system by the N400 block of the "conventional machining-program example 1". Therefore, regarding the N400 block of the "conventional machining-program example 1" and that of the "conventional machining-program example 2", their start points and end points in the machine coordinate system are the same as each other; however, in the former case, the tool 2 moves from the start point to the end point along the circular path while keeping the relative position against the table 1, while, in the latter case, the tool 2 moves from the start point to the end point along the linear path without keeping the relative position against the table 1.

Patent Document 1: Japanese Patent Application Publication Laid-Open No. 2003-195917.

DISCLOSURE OF THE INVENTION

Problems to be Solved by the Invention

According to the conventional numerical control device, as the above "conventional machining-program example 2", when the positioning operation in the machine coordinate system accompanying the rotation of the table 1 is commanded, a machining-program creator needs to previously obtain an end point (−210.0, −150.0, 0.0) of the tool 2 in the machine coordinate system, and then specify the obtained end point in the machining program; therefore, a problem has occurred in which much effort and cost is needed to obtain the end point.

Means for Solving the Problem

In order to solve the above described problem, a numerical control device according to an aspect of the present invention, by controlling, based on a machining program, a machine tool having a plurality of linear movement axes and at least one axis of rotational movement axes for turning a table, for machining using a tool a workpiece fixed to the table, includes a central processing unit, a recording medium for recording the machining program including an interpolation command with respect to a machining operation and an interpolation command in a non-machine coordinate system with respect to a non-machining operation, to which a previously defined command code is attached, and a servo amplifier for driving, in accordance with a movement amount, obtained by the central processing unit based on the interpolation commands, corresponding to each of the axes, a servo motor corresponding to each of the axes.

In a numerical control device according to a next aspect of the invention, the command code is a command for transforming, into the interpolation command in the machine coordinate system, the interpolation command to which the command code is attached, in the non-machine coordinate system, with respect to the non-machining operation.

A method of controlling a numerical control device according to an aspect of the present invention, by controlling a machine tool having a plurality of linear movement axes and at least one axis of rotational movement axes for turning a table, for machining using a tool a workpiece fixed to the table, includes an interpolation-command reading step of reading an interpolation command included in a machining program, an interpolation-command determination step of determining whether the interpolation command read in the interpolation-command reading step is an interpolation command in a non-machine coordinate system with respect to a non-machining operation, a first driving step of driving, when the interpolation command is determined, in the interpolation-command determination step, not to be an interpolation command in the non-machine coordinate system with respect to the non-machining operation, a servo motor corresponding to each of the movement axes in accordance with the interpolation command, and a second driving step of driving, when the interpolation command is determined, in the interpolation-command determination step, to be the interpolation command in the non-machine coordinate system with respect to the non-machining operation, a servo motor corresponding to each of the movement axes, so that, after the interpolation command is transformed to an interpolation command in a machine coordinate system, the tool moves by interpolation from a start-point coordinate to an end-point coordinate in the interpolation command along a linear path.

In a method of controlling a numerical control device according to a next aspect of the invention, the interpolation-command determination step determines whether a coordinate-system transformation command for transforming an interpolation command from the interpolation command in the non-machine coordinate system into an interpolation command in the machine coordinate system is attached to the interpolation command read in the interpolation-command reading step.

A system program, according to an aspect of the present invention, to be executed by a central processing unit of a numerical control device, by controlling based on a machining program a machine tool having a plurality of linear movement axes and at least one axis of rotational movement axes for turning a table, for machining using a tool a work piece fixed to the table, the system program includes an interpolation-command reading step of reading an interpolation command included in a machining program, a coordinate-system transformation command determination step of determining whether a coordinate-system transformation command for transforming the interpolation command from an interpolation command in a non-machine coordinate system into an interpolation command in a machine coordinate system is attached to the interpolation command read in the interpolation-command reading step, a first interpolation step of obtaining, when the coordinate-system transformation command determination step determines that the coordinate-system transformation command is not attached to the read-in interpolation command, a first movement amount corresponding to each of the movement axes in accordance with the interpolation command, a second interpolation step of transforming, when the coordinate-system transformation command determination step determines that the coordinate-system transformation command is attached to the read-in interpolation command, the read-in interpolation command into an interpolation command in the machine coordinate system, to obtain a second movement amount corresponding to each of the movement axes in accordance with the transformed interpolation command, and a driving step of driving a servo motor corresponding to each of the movement axes based on the first movement amount or the second movement amount.

In a system program according to a next aspect of the invention, the second interpolation step transforms, from a start-point coordinate and an end-point coordinate in the non-machine coordinate system included in the read-in interpolation command to which a coordinate-system transformation command is attached, into a start-point coordinate and an end-point coordinate, respectively, in the machine coordinate system, respectively.

In a system program according to a next aspect of the invention, the read-in interpolation command to which a coordinate-system transformation command is attached is an interpolation command in the non-machine coordinate system with respect to a non-machining operation.

Advantageous Effect of the Invention

According to the present invention, in the process in which a machining program is executed, a command in the non-machine coordinate system can be transformed into that in the machine coordinate system; therefore, because, when a machining-program creator creates a machining program, the end point in the machine coordinate system, of a block which commands the rotation of the table does not need to be obtained, the machining program can be created easily and at low cost, by which there is no possibility of the tool departing from its software-limitation range to move and interfering with peripheral devices thereof.

| EXPLANATION OF REFERENCES | |
|---|---|
| 1: | Table |
| 2: | Tool |
| 3: | Workpiece |
| 40: | Numerical control device |
| 41: | CPU |
| 42: | ROM |
| 43: | Machining-program memory unit |
| 50-54: | Movement amount output unit(s) |
| 60-64: | Servo amplifier(s) |

BEST MODE FOR CARRYING OUT THE INVENTION

Figure 4:
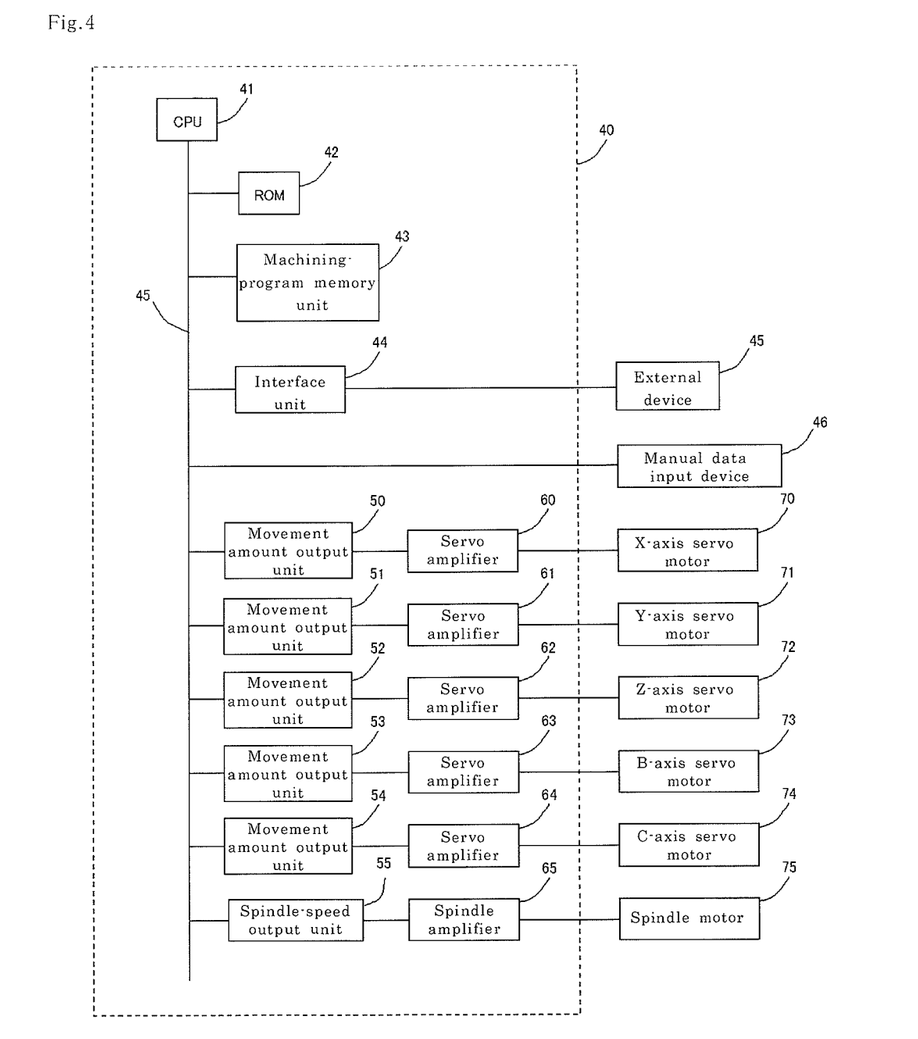
FIG. 4 is a block diagram representing a configuration of a numerical control device 40 according to this embodiment.
Figure 5:
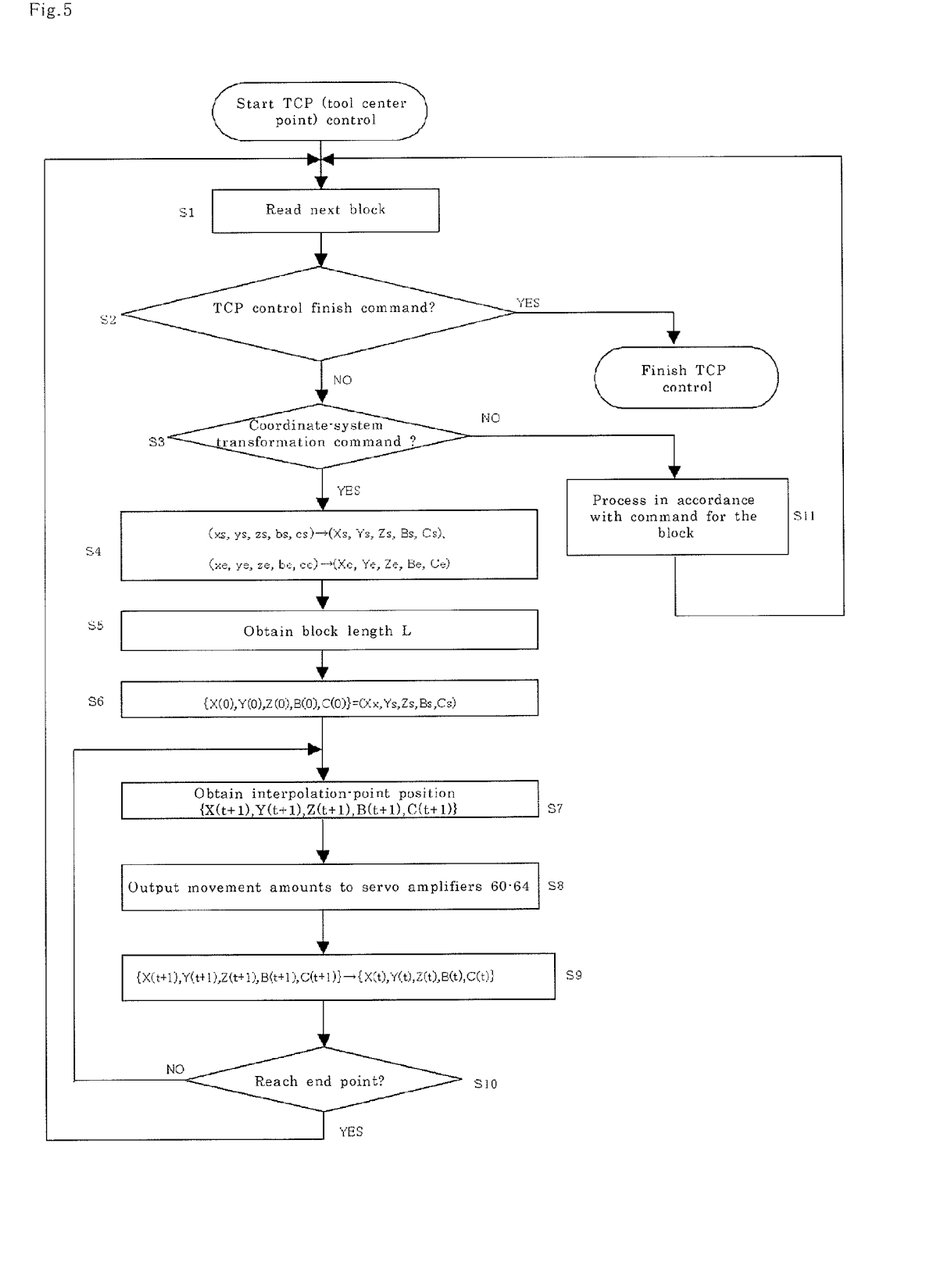
FIG. 5 is a flow chart representing an operation of the numerical control device 40 according to this embodiment.

A first embodiment according to the present invention is explained referring to FIG. 4 and FIG. 5. FIG. 4 is a block diagram representing a configuration of a numerical control device 40 according to the present embodiment. FIG. 5 is a flow chart representing an operation of the numerical control device 40 according to the present embodiment.

In FIG. 4, numeral 40 denotes the numerical control device. A CPU (central processing unit) 41 reads out a system program stored in a ROM (read-only memory) 42 through a bus 45, and controls the whole of the numerical control device 40 in accordance with the system program. A machining-program memory unit 43 configured with a RAM (random-access memory) as a recording medium memorizes a machining program and the like inputted through an I/F (interface) unit 44 or a manual data input device 46. The I/F unit 44 enables connection between the numerical control device 40 and an external device 45 such as an FCA (fiber cable adapter). The manual data input device 46 such as a CRT/MDI (cathode ray tube/multiple document interface) is provided with a display and a key board, etc.

As a machining program, for example, the following is to be inputted. The following machining program is an example of a non-machining operation command of the TCP control, which expresses a coordinate-system transformation command and a C-axis positioning command for determining the opposite-side face of a workpiece. Here, to simplify the explanation, machining commands for a cut-machining operation and the like are not expressed. Additionally, the position of the C-axis as the table rotation axis is assumed to be previously set to 0 degree.

<Machining-Program Example of the Present Invention>
N100 G28 XYZ: Reset to mechanical origin point
N200 G54 G00 X100.Y100.: Select work coordinate system, Position to start point
N300 G43.4: Start TCP control
N400 G00 C180. P1: Position, Transform coordinate system
N500 G49: Finish TCP control A different point between the "machining-program example of the present invention", and the "conventional machining-program example 1" and the "conventional machining-program example 2" is that the command in the N400 block of the "conventional machining-program example 1" is "G00 C180.", and that in the N400 block of the "conventional machining-program example 2" is "G53 X-210. Y-150. C180.", but that in the N400 block of the "machining-program example of the present invention" is "G00 C180. P1". According to the N400 block of the "machining-program example of the present invention", the machine tool operates as represented in FIG. 3. The blocks except for this N400 block are the same as those of the "conventional machining-program examples 1 and 2".

In the N400 block of the "machining-program example of the present invention", the command code "P1" is a code of a coordinate-system transformation command for transforming the command in the non-machine coordinate system into that in the machine coordinate system. By the N400 block, the end point of the C-axis is set to 180 degrees, and the positioning command "G00 C180." in the table coordinate system for turning the C-axis to the end point is transformed to a command in the machine coordinate.

In FIG. 4, movement-amount output units 50-54 each corresponding to the X-, Y-, Z-, B-, and C-axis output, to respective servo amplifiers 60-64, movement amounts from the present positions of the tool 2 and the table 1 to positions of the interpolation points obtained by the CPU 41. Each of the servo amplifiers 60-64 corresponding to each of the axes rotates, in accordance with each movement amount outputted by the movement-amount output units 50-54, each of servo motors 70-74 with respect to each of the axes. The servo motors 70-74 corresponding to each axis drives each of the X-, Y-, Z-, B-, and C-axis, respectively, of the machine tool. The servo amplifiers 60-64 corresponding to the axes rotates respective motors of the axes in accordance with the respective movement amounts output from the movement-amount output units 50-54, to drive the X-, Y-, Z-, B-, and C-axes of the machine tool. A spindle-speed output unit 55 outputs, to an amplifier 65 for the spindle, a command rotation speed commanded by the CPU 41. A spindle motor 75 rotates the spindle motor 75 in accordance with the commanded rotation speed outputted from the spindle amplifier 65. The spindle motor 75 rotates a spindle 2a of the tool 2.

Next, an operation of the numerical control device 40 is explained. The CPU reads out block to block a machining program memorized in the machining-program memory unit 43, and then determines whether the read-out block includes the TCP-control start command "G43.4" or not. When it is determined not to be the TCP-control start command "G43.4", a control other than the TCP control, such as for example resetting to the machine origin point, positioning to the start point, and compensating an error in placement of the workpiece is performed in accordance with the commands in the blocks, for example, reset to the mechanical origin point, positioning to the start point, and compensation of workpiece placing error, etc.

When it is determined to be the TCP-control start command "G43.4", the processing represented in FIG. 5 is performed. FIG. 5 is the flow chart representing the processing performed after the CPU 41 has read the TCP-control start command "G43.4". First, the CPU 41 reads next block (S1), and then determines whether the read block is the TCP control finish command "G49" or not (S2). When it is determined to be the TCP control finish command "G49", the TCP control is finished. When it is determined not to be the TCP control finish command "G49", the CPU determines whether the read block includes the coordinate-system transformation command "P1" or not (S3).

Next, when it is determined not to be the coordinate-system transformation command "P1", the TCP control is performed in accordance with the command in the block without transforming the coordinate system (S11). Next, the process returns to S1, and then the process after S1 is executed. When it is determined to be the coordinate-system transformation command "P1", a start point (xs, ys, zs, bs, cs) and an end point (xe, ye, ze, be, ce) in the non-machine coordinate system of the block are transformed into a start point (Xs, Ys, Zs, Bs, Cs) and an end point (Xe, Ye, Ze, Be, Ce) in the machine coordinate system, respectively (S4). As the method of transforming the coordinate in the non-machine coordinate system into that in the machine coordinate system, the same method as a conventional method (for example, Equations 18-20 in Patent Document 1) may be applied.

For example, a procedure for transforming the coordinate system in the N400 block of the "machining-program example of the present invention" is as follows. First, a start point (100.0, 100.0, 0.0, 0.0, 0.0) in the table coordinate system is transformed into a start point (−90.0, −50.0, 0.0, 0.0, 0.0) in the machine coordinate system. Next, an end point (100.0, 100.0, 0.0, 0.0, 180.0) in the table coordinate system is transformed into an end point (−210.0, −150.0, 0.0, 0.0, 180.0) in the machine coordinate system, which latter point is to be a point of the start point (−90.0, −50.0, 0.0, 0.0, 0.0) in the machine coordinate system being rotated 180 degrees around the C-axis center position (−150.0, −100.0, 0.0) in the machine coordinate system. Therefore, by the commands in the N400 block, the tool 2 moves along the linear path indicated by the heavy line arrow, as with the N400 block of the "conventional machining-program example 2".

Next, based on the obtained start point (Xs, Ys, Zs, Bs, Cs) and end point (Xe, Ye, Ze, Be, Ce) in the machine coordinate system, a block length L as the total movement amount by the block is obtained (S5). The block length L is a length of the line-segment connecting between the start point (Xs, Ys, Zs, Bs, Cs) and the end point (Xe, Ye, Ze, Be, Ce) in the machine coordinate system, which can be obtained by the following equation.

$$L = \sqrt{(Xe-Xs)^2 + (Ye-Ys)^2 + (Ze-Zs)^2 + (Be-Bs)^2 + (Ce-Cs)^2}$$

Next, the TCP and the table position {X(0), Y(0), Z(0), B(0), C(0)} at the time t=0 is taken as the start point (Xs, Ys, Zs, Bs, Cs), and set as follows (S6).

$$\{X(0),Y(0),Z(0),B(0),C(0)\}=(Xs,Ys,Zs,Bs,Cs)$$

Next, a position of the interpolation point of the TCP after an interpolation period Δt from the present time is obtained by the following equations for each interpolation period Δt (S7). The following equations represent a relationship between the present position {X(t), Y(t), Z(t), B(t), C(t)} at the present time t and the position of the TCP interpolation point {X(t+1), Y(t+1), Z(t+1), B(t+1), C(t+1)} at the interpolation time t+1 after the interpolation period Δt from the present time t. F is command relative speed of the TCP for the workpiece 3.

$$X(t+1)=F\times\Delta t\times(Xe-Xs)/L+X(t)$$

$$Y(t+1)=F\times\Delta t\times(Ye-Ys)/L+Y(t)$$

$$Z(t+1)=F\times\Delta t\times(Ze-Zs)/L+Z(t)$$

$$B(t+1)=F\times\Delta t\times(Be-Bs)/L+B(t)$$

$$C(t+1)=F\times\Delta t\times(Ce-Cs)/L+C(t)$$

Next, difference for each axis, as a movement amount in a period from the present time t to the time t+1, which is obtained by subtracting the present position {X(t), Y(t), Z(t), B(t), C(t)} at the present time t from the position of the interpolation point {X(t+1), Y(t+1), Z(t+1), B(t+1), C(t+1)} at the time t+1 according to the above equations, is outputted to each of the servo amplifiers 60-64 for each axis (S8). Next, the position {X(t+1), Y(t+1), Z(t+1), B(t+1), C(t+1)} is memorized as the present position {X(t), Y(t), Z(t), B(t), C(t)} (S9), and then checking is performed whether the TCP reaches the end point (Xe, Ye, Ze, Be, Ce) of the block (S10). Here, for example, checking is performed whether the following equation is satisfied.

$$\{X(t),Y(t),Z(t),B(t),C(t)\}=(Xe,Ye,Ze,Be,Ce)$$

In S10, if a determination is made that the TCP has reached the end point (Xe, Ye, Ze, Be, Ce), the process returns to S1, and then the steps following S1 are executed.

Here, although the transformation, from the command in the table coordinate system to that in the machine coordinate system, in the TCP control is explained in this embodiment, transformation in the TCP control may be configured to be performed from a command in the work coordinate system to that in the machine coordinate system. Moreover, the transformation from the command in the non-machine coordinate system to that in the machine coordinate system may be performed not only in the TCP control but also in any control, such as workpiece-mounting-error compensation control, taken by a machine tool having at least one table rotation axis.

In this embodiment, "P1" has been used as the command code for transforming the coordinate system; however, the command code is not limited thereto. For example, the command may be executed by a new G-code, configured to be executed by passing an address as an argument, or configured to be executed using a parameter. For example, when the command code of "G00" is executed, the interpolation may be always configured to be performed in the machine coordinate system. That is, regarding a block to which "G00" is given as a command in the machine coordinate system, the coordinate-system transformation is not performed and the processing is performed in accordance with the command of the block, while regarding a block to which "G00" is given as a command in the non-machine coordinate system, the command is transformed into a command in the machine coordinate system and then the processing is performed in accordance with the command.

In this embodiment, the case is explained in which the numerical control device transforms the coordinate system during the machining program is executed; however, after the coordinate system transformation of the inputted machining program having been previously performed, the machining program whose coordinate system has been transformed is memorized, and then, when the machining is actually performed, the machining program whose coordinate system has been transformed may be configured to be executed instead of the inputted machining program. By this configuration, processing of the numerical control device during the execution of the machining program can be partially omitted.

According to this embodiment, because, in the process of executing a machining program by the CPU of the numerical control device, a command in the non-machine coordinate system can be transformed into that in the machine coordinate system, when a machining-program creator creates a machining program, the end point in the machine coordinate system of the block in which the table rotation is commanded is not needed to be obtained; therefore, the machining program can be created easily and at low cost, by which there is no possibility of the tool departing from its software-limitation range to move and interfering with peripheral devices thereof.

What is claimed is:

1. A numerical control device for machining, based on a machining program, a workpiece fixed to a table using a machine tool having a plurality of linear movement axes and at least one rotational movement axis for turning the table, the device comprising:
   a processor configured to:
      read an interpolation command included in the machining program;
      determine whether a coordinate-system transformation command, for transforming the interpolation command from an interpolation command in a non-machine coordinate system into an interpolation command in a machine coordinate system, is attached to the read interpolation command;
      obtain, in response to determining that the coordinate-system transformation command is not attached to the read interpolation command, a first movement amount corresponding to each of the movement axes in accordance with the read interpolation command;
      transform, in response to determining that the coordinate-system transformation command is attached to the read interpolation command, the read interpolation command into an interpolation command in the machine coordinate system, to obtain a second movement amount corresponding to each of the movement axes in accordance with the transformed interpolation command; and
      drive a servo motor corresponding to each of the movement axes based on the first movement amount or the second movement amount,
   wherein the processor is configured to transform a start-point coordinate and an end-point coordinate in the non-machine coordinate system included in the read interpolation command, to which the coordinate-system transformation command is attached, into a start-point coordinate and an end-point coordinate in the machine coordinate system, respectively.

2. A non-transitory computer readable medium storing a system program to be executed by a central processing unit of a numerical control device which machines, based on the system program, a workpiece fixed to a table using a machine tool having a plurality of linear movement axes and at least one rotational movement axis for turning a table, the system program comprising:

- an interpolation-command reading step of reading an interpolation command included in a machining program;
- a coordinate-system transformation command determination step of determining whether a coordinate-system transformation command, for transforming the interpolation command from an interpolation command in a non-machine coordinate system into an interpolation command in a machine coordinate system, is attached to the interpolation command read in the interpolation-command reading step;
- a first interpolation step of obtaining, in response to determining in the coordinate-system transformation command determination step that the coordinate-system transformation command is not attached to the read-in interpolation command, a first movement amount corresponding to each of the movement axes in accordance with the interpolation command;
- a second interpolation step of transforming, in response to determining in the coordinate-system transformation command determination step that the coordinate-system transformation command is attached to the read-in interpolation command, the read-in interpolation command into an interpolation command in the machine coordinate system, to obtain a second movement amount corresponding to each of the movement axes in accordance with the transformed interpolation command; and
- a driving step of driving a servo motor corresponding to each of the movement axes based on the first movement amount or the second movement amount,
- wherein the second interpolation step transforms a start-point coordinate and an end-point coordinate in the non-machine coordinate system included in the read-in interpolation command, to which the coordinate-system transformation command is attached, into a start-point coordinate and an end-point coordinate in the machine coordinate system, respectively.

3. The non-transitory computer readable medium as recited in claim 2, wherein in the coordinate-system transformation command determination step, the read-in interpolation command to which the coordinate-system transformation command is attached is determined as the interpolation command in the non-machine coordinate system with respect to a non-machining operation.

\* \* \* \* \*